United States Patent [19]

Nammatsu et al.

[11] Patent Number: 5,151,298

[45] Date of Patent: Sep. 29, 1992

[54] PROCESS FOR PREPARING ORIENTATION FILM FOR LIQUID CRYSTALS

[75] Inventors: Akihiro Nammatsu, Tenri; Mitsuo Ishii, Yamatokoriyama; Shigehiro Minezaki, Ikoma, all of Japan

[73] Assignee: Sharp Kabushiki Kaisha, Osaka, Japan

[21] Appl. No.: 357,967

[22] Filed: May 30, 1989

[30] Foreign Application Priority Data

May 30, 1988 [JP] Japan ................... 63-132476

[51] Int. Cl.$^5$ .......................................... C23C 26/00
[52] U.S. Cl. ........................... 427/77; 427/359; 427/372.2; 427/378
[58] Field of Search ............... 427/77, 359, 372.2, 427/378

[56] References Cited

U.S. PATENT DOCUMENTS

| | | | |
|---|---|---|---|
| 3,994,567 | 11/1976 | Matsuo | 350/343 |
| 4,087,575 | 5/1978 | Bichara | 427/385.5 |
| 4,143,297 | 3/1979 | Fischer | 313/502 |
| 4,273,420 | 6/1981 | Watanabe | 350/341 |
| 4,362,771 | 12/1982 | Umeder | 350/343 |
| 4,402,999 | 9/1983 | Tatsumichi | 427/126.3 |
| 4,555,436 | 11/1985 | Geurtsen | 427/148 |
| 4,636,038 | 1/1987 | Kitahara | 350/341 |
| 4,685,771 | 8/1987 | West | 350/350 R |
| 4,772,522 | 9/1988 | Kubota | 427/44 |

OTHER PUBLICATIONS

"Control and Elimination Disclinations in Twisted Nematic Liquid-Crystal Displays" vol. ED-24, No. 7, Jul. 1977.
"Orientation of Liquid Crystals by Surface Coupling Agents" Appl. Phys. Lett., vol. 22, No. 8, Apr. 15, 1973.
"Liquid-Crystal Orientation Induced by Polymeric Surfaces" Journal of Applied Physics, vol. 47, No. 4, Apr. 1976.

Primary Examiner—Shrive Beck
Assistant Examiner—Vi Duong Dang
Attorney, Agent, or Firm—Birch, Stewart, Kolasch & Birch

[57] ABSTRACT

A process for preparing an orientation film for liquid crystals which comprises forming a base layer of a thermoplastic or non-thermoplastic resin to be used for the orientation film, on a substrate for liquid crystal display, and rubbing the base layer under heating at a temperature not lower than 50° C. but below the melting temperature of decomposition temperature of the resin.

16 Claims, 2 Drawing Sheets

PROCESS FOR PREPARING ORIENTATION FILM FOR LIQUID CRYSTALS

BACKGROUND OF THE INVENTION

1. Field of the Invention

The present invention relates to a process for preparing an orientation film for liquid crystals, and more particularly to a process for preparing an orientation film for liquid crystals for use in liquid crystal display devices.

2. Description of the Prior Art

Orientation films for liquid crystals heretofore known for use in liquid crystal display devices include those prepared from synthetic resins such as polyimide resin, polyamide resin, polyvinyl alcohol and the like.

Such an orientation film is prepared by forming a layer of synthetic resin like the one mentioned above on a liquid crystal display substrate provided with transparent electrodes and the like, and rubbing the synthetic resin layer (Okano et al., "Orientation of Liquid Crystal Molecules by Surface Treatment," Liquid Crystal Application Book, pp. 56-57, Baifukan, published 1985). The resin layer is rubbed using a device which includes a rubbing roller covered with a flocked fabric of synthetic fiber. This device will be described below with reference to FIGS. 3 (a), (b) and (c).

These drawings show a rubbing roller 1, a roller shaft 2, brackets 3 for supporting the roller shaft 2, a substrate 4 formed with a synthetic resin layer, a rubbing stage 5 and a stage table 6. The rubbing roller 1, which has a flocked fabric affixed to its surface, is rotated and is also moved relative to the stage table 6 by unillustrated drive means to cause the roller 1 to rub the entire surface of the resin layer on the substrate 4.

The synthetic resin layer is thus rubbed in order to orient liquid crystal molecules orderly for fabricating a liquid crystal display device. The molecular chains at the surface of the resin layer are arranged in a specified direction by this treatment, affording an orientation film for the liquid crystals.

When the molecular chains are to be orderly oriented by the above treatment, the rubbing roller 1 must be rotated at a high speed. For example, the roller, when having a diameter of 10 cm, is rotated usually at a speed of 300 to 500 r.p.m.

Nevertheless, if treated at such a high speed of rotation, the surface of the synthetic resin layer is electrostatically charged greatly, while the rubbing fabric releases a large quantity of flock, with the result that removed pieces of flock, resin cut fragments and like extraneous fragments adhere to the orientation film and are brought to the subsequent process, consequently lowering the reliability of the liquid crystal display device.

It appears favorable to reduce the speed of rotation of the rubbing roller to obviate the drawback, whereas difficulty is then encountered in affording a film with a uniform desirable orientation.

The present invention, which has been accomplished in view of the foregoing problem, provides a process for preparing an orientation film for liquid crystals which is given a satisfactory orientation although treated with a rubbing roller at a greatly reduced speed of rotation.

SUMMARY OF THE INVENTION

Accordingly, the present invention provides a process for preparing an orientation film for liquid crystals which comprises forming a base layer of a thermoplastic or non-thermoplastic resin to be used for the orientation film, on a substrate for a liquid crystal display, and rubbing the base layer under heating at a temperature not lower than 50° C. but below the melting temperature or decomposition temperature of the resin.

DESCRIPTION OF THE PREFERRED EMBODIMENTS

Figure 1A:
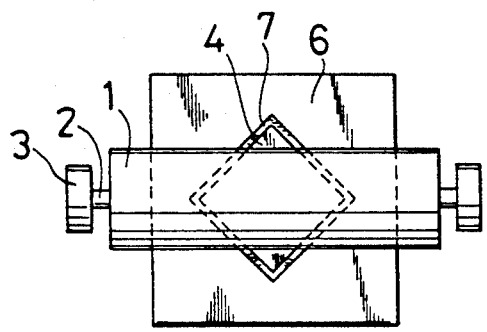
FIGS. 1 (a), (b) and (c) are a plan view, front view and side elevation, respectively, schematically showing a rubbing device for use in an embodiment of the invention.

According to the invention, a base layer for providing an orientation film for liquid crystals is first formed on a substrate for liquid crystal display. The substrate is an insulating substrate, such as a glass, plastics or ceramics substrate, which is formed with an electrode in a specified pattern and an insulating film. For example, the substrate comprises a transparent electrode as of ITO, and a transparent insulating film of $SiO_2$, $Si_3N_4$ or the like covering the electrode.

The base layer of the invention is made of a thermoplastic or non-thermoplastic resin which can be one of various synthetic resins known for use in the art for orienting liquid crystals. Specific examples of such resins include polyimide resins and polyvinyl alcohols. Exemplary of useful polyimide resins are polymers having an imide structure, such as aliphatic polyimide, aromatic polyimide, alicyclic polyimide and polyimidosiloxane. The base layer can be formed by the coating-drying method or coating-sintering method. For example, when to be prepared from a polyimide resin, the layer can be formed by coating the substrate with a mixture solution of a tetracarboxylic acid compound and a diamine compound serving as the starting materials for the polyimide resin, with or without other polycondesable acid compounds incorporated in the solution, or coating the substrate with a solution of polyamidocarboxylic acid which is a condensation product of such compounds, and sintering the resulting coating by heating to form the polyimide on conversion. Further when to be prepared from a polyvinyl alcohol, the layer can be formed by coating the substrate with an organic solvent solution of the alcohol, and drying the coating by heating. Usually the base layer thus formed is preferably 200 to 1200 angstroms, more preferably 500 to 1000 angstroms, in thickness.

The base layer is then rubbed as heated. The rubbing treatment itself is conducted usually using a device including a rubbing roller. More specifically, the rubbing device to be used comprises a rubbing stage movable and adapted to fixedly place the substrate thereon, a rubbing roller opposed to the rubbing stage and having its surface covered with a rubbing fabric or flocked with rubbing fibers, and rotating means for rotating and controlling the rubbing roller.

When the base layer is rubbed by the device, the layer is heated by operating heating means, such as a heater or hot plate, embedded in one of the components of the device or by operating independent heating means such as a hot air applicator or heat radiator.

The base layer is heated at a temperature not lower than 50° C. but below the melting temperature or decomposition temperature of the synthetic resin forming the layer. If the temperature is lower than 50° C., it is difficult to obtain an orientation film with a satisfactory orientation by driving the rubbing roller at a low speed of rotation. In the case where the base layer is made of a thermoplastic resin such as PVA and is heated at a temperature above the melting temperature, the layer itself is softened or deformed and becomes difficult to rub even for a shortened period of time. On the other hand, if the layer is made of a non-thermoplastic resin such as polyimide resin and is heated at a temperature exceeding the decomposition temperature, difficulties are encountered in preparing a film with a satisfactory orientation even if the treating time is shortened. It is especially desirable that the heating temperature be 50° to 200° C. to prevent the deterioration of the rubbing fabric or fibers over the surface of the rubbing roller. For example, it is generally desirable that the temperature be about 130° to about 230° C. for polyimide resins.

The speed at which the rubbing roller is to be rotated for rubbing the base layer as heated is not limited specifically but can be much lower than is used for the conventional rubbing treatment. For example, the rubbing roller, when 10 cm in diameter, must conventionally be rotated at a speed of about 300 to about 500 r.p.m., whereas the process of the invention can be practiced at a speed below 300 r.p.m. and even up to 100 r.p.m. It is especially suitable that the speed be about 50 to about 150 r.p.m. to prevent the charging of the base layer surface and diminish the removal of flock from the rubbing cloth. Preferably, the speed is about 80 to about 120 r.p.m. The overall period of time for the rubbing treatment can be generally the same as is conventionally used and is usually about 0.5 to about 10 minutes to achieve a suitable result although variable with the surface area of the substrate.

Embodiments of rubbing treatment of the invention will be described below.

Figure 1B:
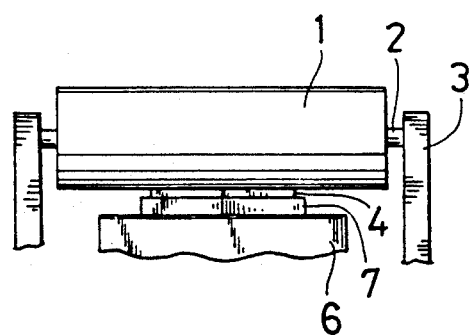
Figure 1C:
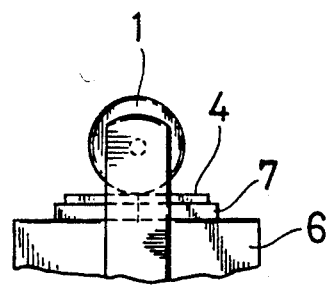
Figure 3A:
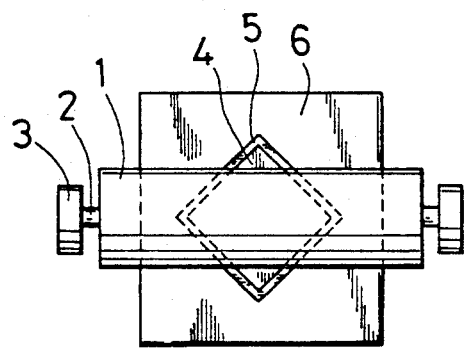
FIGS. 3 (a), (b) and (c) are plane view, front view and side elevation, respectively, schematically showing a conventional rubbing device.
Figure 3B:
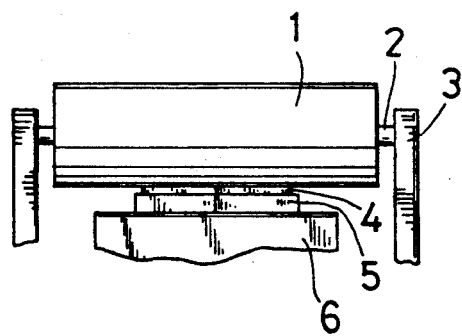
Figure 3C:
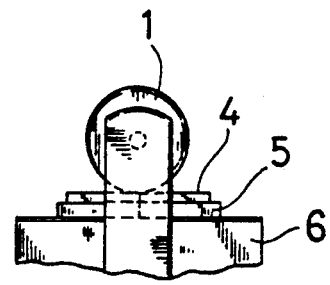

The rubbing stage is heated in the first embodiment. FIGS. 1 (*a*), (*b*) and (*c*) are diagrams showing a device for this purpose. This device basically has the same construction as the one shown in FIGS. 3 (*a*) to (*c*), but the rubbing stage, which is indicated at 7, has a hot plate incorporated therein. The hot plate is operated to heat the rubbing stage 7 and thereby heat the base layer on a substrate 4, rendering the layer easy to rub. Consequently, a sufficient orientation effect can be achieved by rotating the rubbing roller 1 at a lower speed than in the conventional device. The lower speed results in a corresponding reduction in the amounts of static electricity and extraneous matter produced.

Figure 2:
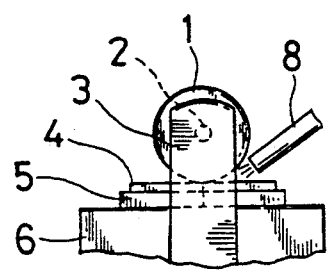
FIG. 2 is a side elevation schematically showing a rubbing device for use in another embodiment of the invention.

FIG. 2 shows a device for practicing a second embodiment. The device has the same rubbing stage 5 as in the conventional device, and an air nozzle 8 for applying hot air to a substrate 4 to heat the base layer on the substrate 4.

It is also possible to heat the base layer on the substrate by other means such as a heater incorporated in the rubbing roller 1 for heating the roller 1.

When heated in this way, the base layer can be given an improved orientation by rubbing at a low speed of rotation presumably for the following reason. When the base layer is heated, the polymer molecular chains thereof become unstable and easier to orient in the specified direction by the rubbing treatment, which can therefore be conducted with an improved efficiency. This permits a proper orientation treatment by rotating the rubbing roller at a reduced speed, consequently decreasing the quantities of static electricity and extraneous matter to be produced by rubbing.

EXAMPLE

Orientation films for liquid crystals were prepared using the rubbing device of FIG. 1 wherein the rubbing stage 7 has a hot plate incorporated therein. The rubbing roller was 10 cm in diameter, controllable in speed of rotation and covered with flock of rayon.

Glass substrates ($100 \times 100 \times 1.0$ mm) were used for evaluation. A solution of starting materials for a polyimide resin, OPTMER - AL (product of Japan Synthetic Rubber Co., Ltd., Japan) was applied to the surface of the substrate by spin coating and heated (sintered) at about 200° C. for 1 hour to form a polyimide layer about 800 angstroms in thickness (decomposition temperature about 400° C.).

The substrate formed with the polyimide layer was fixedly placed on the rubbing stage 7 of the device, and the layer was rubbed for about 1.2 minutes with the rubbing roller 1 which was rotated at a specified speed while moving the rubbing stage 7 in one direction and operating the hot plate to heat the substrate in its entirety at about 180° C.

A pair of substrates each having the orientation film thus formed were arranged as opposed to each other at a spacing of about 9 $\mu$m with the directions of orientations intersecting each other, commercial nematic liquid crystals were injected into the space between the substrates, and the periphery of the assembly was sealed off with a sealant.

With the resulting cell interposed between two polarizers, light was passed through the cell via parallel Nicol prisms, and the transmitted light was checked with the unaided eye for homogeneity (orientation).

Additionally, the capacitance of the substrate was measured with a commercial simplified capacitance measuring instrument. The orientation film prepared by the rubbing treatment was also checked microscopically for the adhesion of extraneous matter.

The results are given in Table 1 along with those achieved by a comparative example, which was prepared and tested in the same manner as above except that the rubbing treatment was conducted at room temperature (about 25° C.).

TABLE 1

| | Comparative Example | | Invention | |
|---|---|---|---|---|
| | Roller speed (r.p.m.) | | | |
| | 100 | 400 | 100 | 400 |
| Orientation*1 | Poor | Good | Good | Best |
| Extraneous*2 matter | Almost none | Much | Almost none | Much |
| Capacitance*3 | Nearly zero | At least 1 kV | Nearly zero | At least 1 kV |
| Overall evaluation | Poor | Fair | Good | Fair |

Note
*1 Should be at least "good" for the production of the film.
*2 Microscopically observed at × 100.
*3 "Nearly zero" means up to 50 V.

The table reveals that the amount of extraneous matter and the capacitance are less at the lower roller speed, while the orientation is better at the higher roller speed. In orientation, however, the example of the invention is better than the comparative example. The orientation obtained at 100 r.p.m. by the invention is equivalent to that obtained at 400 r.p.m. by the conventional method. Thus, the decrease in the speed of rotation poses no problem on the orientation but reduces the amounts of extraneous matter and static electricity to be produced. The results achieved indicate that the process of the invention is exceedingly superior.

In brief, the process of the present invention is adapted to rub the base layer as heated, giving a satisfactory orientation to the layer at a low speed of rotation of the rubbing roller to provide an orientation film. The low speed inhibits the extraneous matter to be produced by rubbing to preclude the reduction in reliability due to the adhesion of extraneous matter, further inhibiting the static electricity to be generated by rubbing and eliminating the trouble that could occur electrostatically.

What we claim is:

1. A process for preparing an orientation film for liquid crystals which comprises:
    forming a base layer of a thermoplastic or non-thermoplastic resin, to be used for the orientation film, on a substrate for a liquid crystal display, and
    rubbing the base layer while simultaneously heating the base layer at a temperature not lower than 50° C. and below the melting temperature or decomposition temperature of the resin.
2. The process of claim 1 in which the base layer is formed from polyvinyl alcohol.
3. The process of claim 1 in which the base layer is formed from polyimide resin.
4. The process of claim 3 in which the polyimide resin is an aliphatic polyimide, aromatic polyimide, alicyclic polyimide or polyimidosiloxane.
5. The process of claim 1 in which the base layer has a thickness of 200 to 1200 angstroms.
6. The process of claim 1 in which the heating is conducted at a temperature in the range of from 50° C. to 200° C.
7. The process of claim 1 in which the rubbing is conducted by using a rubbing device which comprises a rubbing stage movable and adapted to fixedly place the substrate thereon, a rubbing roller opposed to the rubbing stage and having its surface covered with a rubbing fabric or flocked with rubbing fibers, and rotating means for rotating and controlling the rubbing roller.
8. The process of claim 7 in which the rubbing roller is rotated at a speed of about 50 to about 150 r.p.m.
9. The process of claim 7 in which the rubbing roller is rotated at a speed of about 80 to about 120 r.p.m.
10. The process of claim 1 in which the substrate comprises an insulating substrate, a transparent electrode formed on the insulating substrate and a transparent insulating film covering the electrode.
11. The process of claim 1 in which the base layer is formed from a thermoplastic resin.
12. The process of claim 1 in which the base layer is formed from a non-thermoplastic resin.
13. The process of claim 1 in which the base layer has a thickness of 500 to 1000 angstroms.
14. The process of claim 1 in which the heating of the base layer is conducted by using a hot air applicator or a heat radiator.
15. The process of claim 1 in which the heating is conducted at a temperature in the range of from 130° C. to about 230° C.
16. The process of claim 7 in which the heating of the base layer is conducted by using a hot plate incorporated in the rubbing stage.

* * * * *